US009802537B2

(12) United States Patent
Tetsuka et al.

(10) Patent No.: US 9,802,537 B2
(45) Date of Patent: Oct. 31, 2017

(54) APPROACH NOTIFICATION DEVICE OF STRADDLE TYPE VEHICLE

(71) Applicant: HONDA MOTOR CO., LTD., Tokyo (JP)

(72) Inventors: Takashi Tetsuka, Wako (JP); Yasumasa Matsui, Tokyo (JP); Ryuta Niimura, Wako (JP); Syunichi Miyagishi, Wako (JP); Jun Adachi, Wako (JP); Kosuke Kuroda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 71 days.

(21) Appl. No.: 14/831,267

(22) Filed: Aug. 20, 2015

(65) Prior Publication Data
US 2016/0090037 A1 Mar. 31, 2016

(30) Foreign Application Priority Data
Sep. 26, 2014 (JP) .................................. 2014-196816

(51) Int. Cl.
*B60Q 9/00* (2006.01)
*B60W 50/16* (2012.01)
*B60W 30/18* (2012.01)

(52) U.S. Cl.
CPC .............. *B60Q 9/008* (2013.01); *B60W 50/16* (2013.01); *B60W 30/18163* (2013.01); *B60W 2300/36* (2013.01)

(58) Field of Classification Search
CPC .............. B60Q 9/008; B60W 30/0953; B60W 30/0956; B60W 50/16; B60W 2300/36; B60W 2540/20; B60W 30/18163
(Continued)

(56) References Cited

U.S. PATENT DOCUMENTS

2003/0078524 A1* 4/2003 Young .................... A61H 21/00
601/46
2004/0135679 A1* 7/2004 Kushida ............. G02B 27/0101
340/425.5
(Continued)

FOREIGN PATENT DOCUMENTS

DE 102014213392 A1 1/2016
GB 2386732 B 7/2005
(Continued)

*Primary Examiner* — George Bugg
*Assistant Examiner* — Thang Tran
(74) *Attorney, Agent, or Firm* — Rankin, Hill & Clark LLP

(57) ABSTRACT

An approach notification device of a straddle type vehicle which can effectively notify a rider of an approaching state of an obstacle, the device including an obstacle detection device for detecting an obstacle located around a motorcycle as an vehicle, an approach determination device for detecting an approaching state that the obstacle is located within a predetermined distance from the vehicle, and a winker operation resistance increasing device for increasing operation resistance of a winker manipulator of a winker device provided in the vehicle. When the obstacle is determined to be within the predetermined distance by the approach determination device and the operation of the winker manipulator in the direction of the obstacle is detected, the winker operation resistance increasing device is operated to increase the operation resistance of the winker manipulator and vibrators located in a steering handle and a fuel tank are operated.

15 Claims, 12 Drawing Sheets

(58) Field of Classification Search
USPC .......................................................... 340/435
See application file for complete search history.

(56) References Cited

U.S. PATENT DOCUMENTS

| | | | |
|---|---|---|---|
| 2005/0190047 A1* | 9/2005 | Lemke | B60Q 9/008 340/435 |
| 2005/0258977 A1 | 11/2005 | Kiefer | |
| 2006/0097857 A1* | 5/2006 | Osaka | B60Q 9/006 340/435 |
| 2006/0151541 A1* | 7/2006 | Pares Montaner | B05B 11/3007 222/321.2 |
| 2008/0112174 A1* | 5/2008 | Nakano | B60Q 1/12 362/466 |
| 2008/0128190 A1* | 6/2008 | Tsutsumi | B60Q 9/00 180/219 |
| 2008/0269015 A1* | 10/2008 | Ochiai | B60K 26/02 477/209 |
| 2010/0060440 A1* | 3/2010 | Suzuki | G06K 9/00221 340/435 |
| 2010/0066527 A1 | 3/2010 | Liou | |
| 2010/0073152 A1* | 3/2010 | Nagamine | B60W 50/08 340/425.5 |
| 2010/0156621 A1* | 6/2010 | Nishimura | B60Q 1/42 340/476 |
| 2012/0067122 A1* | 3/2012 | Sakamoto | B60Q 1/12 73/493 |
| 2012/0126965 A1* | 5/2012 | Sanma | B62D 1/046 340/438 |
| 2012/0294741 A1* | 11/2012 | Nishimura | F02M 59/102 417/437 |
| 2013/0073156 A1* | 3/2013 | Takeuchi | F16H 61/0213 701/56 |
| 2013/0311075 A1 | 11/2013 | Tran | |

FOREIGN PATENT DOCUMENTS

| | | |
|---|---|---|
| JP | 09-132094 A | 5/1997 |
| JP | 2008-056136 | 3/2008 |

* cited by examiner

FIG. 10
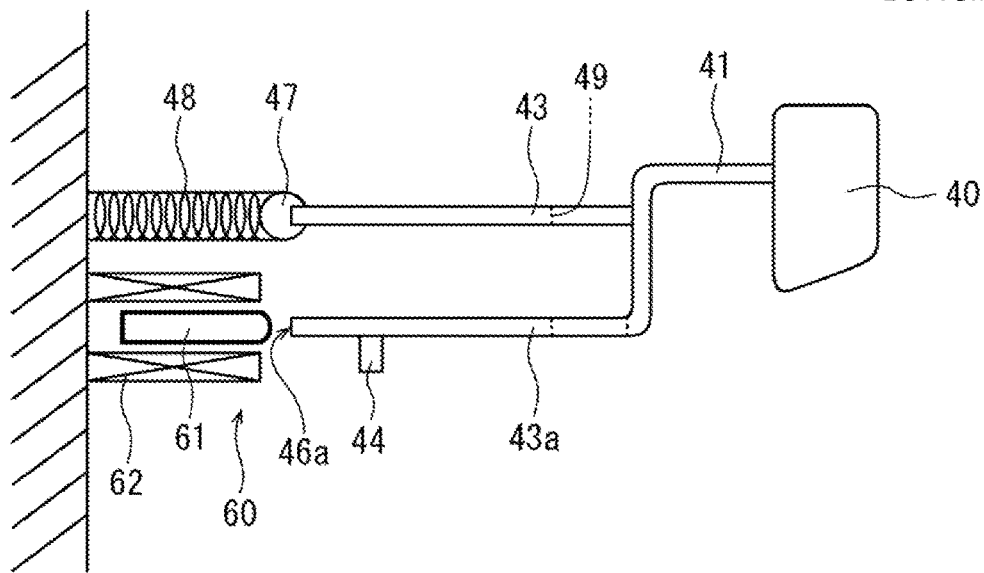
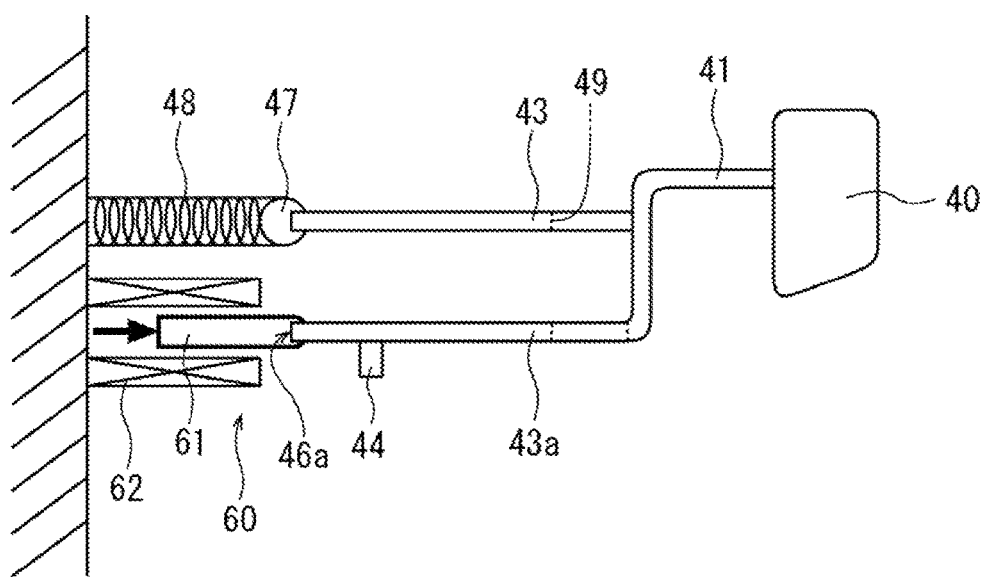

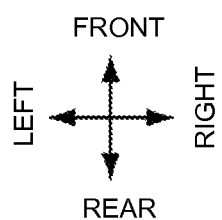
FIG. 11
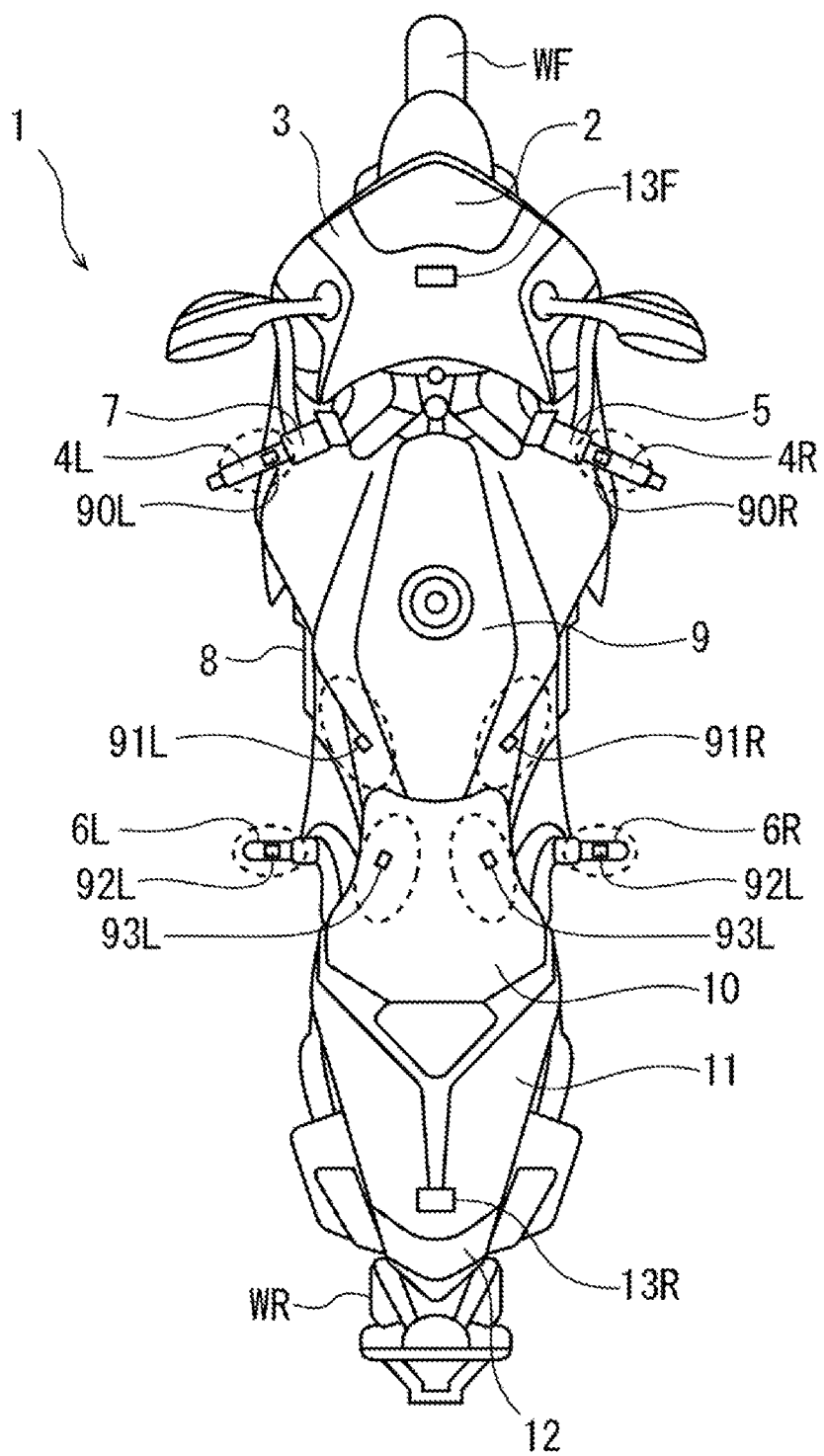

APPROACH NOTIFICATION DEVICE OF STRADDLE TYPE VEHICLE

BACKGROUND OF THE INVENTION

Field of the Invention

The present invention relates to an approach notification device of a straddle type vehicle and particularly, to the approach notification device of the straddle type vehicle for notifying a rider of an approaching state of an obstacle or the like to an vehicle.

Description of Related Art

Hitherto, there is known an approach notification device which detects an obstacle such as another vehicle or the like located around a vehicle and notifies a rider of its approaching state.

Japanese Patent Application Laid-Open Publication No. 2008-56136 discloses an approach notification device provided in a four-wheeled motor vehicle. In this approach notification device, a location of an obstacle around the vehicle is detected by means of a millimeter-wave radar and an onboard camera. At the time a winker operation lever is about to be operated in the direction to approach the obstacle, an obstacle approach is notified in such a manner that a vibrator vibrates this winker operation lever.

However, the approach notification device as described in the Japanese Patent Application Laid-Open Publication No. 2008-56136 is promised on the application to the four-wheeled motor vehicle having a hermetically closed compartment. Therefore, when it is directly applied to a winker manipulator of a straddle type vehicle, it is conceivable that sufficient effects are not obtained since the straddle type vehicle having no compartment is subject to an influence of vibrations and wind at the time of traveling and the rider sometimes wears gloves.

Further, in the straddle type vehicle of which a vehicle body is smaller than that of the four wheeled motor vehicle and on which the rider rides in an exposed fashion, it is desirable that a location in the forward and rearward direction also can be recognized as more detailed information about the location of the obstacle.

SUMMARY OF THE INVENTION

The present invention has been made to solve the problems of the above prior art and it is an object of the present invention to provide an approach notification device of a straddle type vehicle which is capable of effectively notifying a rider of an approaching state of an obstacle.

In order to achieve the above described object, according to a first feature of the present invention, there is provided an approach notification device of a straddle type vehicle comprising an obstacle detection device that detects an obstacle located around the vehicle, an approach determination device that detects an approaching state that the obstacle is located within a predetermined distance from the vehicle, and a winker operation resistance increasing device for increasing operation resistance of a winker manipulator of a winker device, which is provided in the vehicle, wherein when the approaching state that the obstacle is within the predetermined distance from the vehicle is determined by the approach determination device and the operation of the winker manipulator in the direction of a location of the obstacle is detected, the winker operation resistance increasing device is operated to increase the operation resistance of the winker manipulator.

With this configuration, the rider can be notified intuitively by the feeling of a fingertip that various kinds of obstacles such as another vehicle, a pedestrian, a fallen object, a side wall and the like are located in the direction intended to change a route. Further, the operation resistance of the winker manipulator is increased only at the time of manipulation in the direction in which the obstacle is located. Therefore, the operation resistance is not increased in the case where the winker manipulator is manipulated in the direction separating away from the obstacle, so that a feeling of incompatibility is not given to the rider.

In addition, according to a second feature of the present invention, the operation resistance of the winker manipulator is increased only for a predetermined period of time after the operation of the winker manipulator is detected. According to the second feature of the present invention, since the operation resistance of the winker manipulator is increased only for the predetermined period of time after the operation of the operation manipulator is detected, the feeling of resistance is sensed only during an ON operation of the winker manipulator, whereby to be configured in such a way as not to exert an influence upon a return operation or the like following the ON operation.

In addition, according to a third feature of the present invention, there is provided a first notification device that is configured to start its operation under the condition that the approaching state is determined and the winker device is operated in the direction of the location of the obstacle by the operation of the winker manipulator. According to the third feature of the present invention, since there is provided the first notification device that is configured to start its operation under the condition that the approaching state is determined and the winker device is operated in the direction of the location of the obstacle by the operation of the winker manipulator, the approaching state of the obstacle can be recognized due to the increase of the operation resistance, and the state that the winker device is in operation in the direction of the location of the obstacle can be notified to the rider by the vibrator or the like. Therefore, the approaching state can be notified more accurately to the rider.

Further, according to a fourth feature of the present invention, there is provided an approach notification device of a straddle type vehicle including an obstacle detection device that detects an obstacle located around the vehicle, an approach determination device that detects an approaching state that the obstacle is located within a predetermined distance from the vehicle, and a first notification device that configured to start its operation under the condition that the winker device (14) is operated in the direction of the location of the obstacle in a condition where the approaching state is determined.

With this configuration, the state that the winker device is in operation in the direction of the location of the obstacle can be notified to the rider. Moreover, even in the case where the vehicle approaches the obstacle such as another vehicle or the like thereby resulting in the approaching state in the state that the winker device is in operation, the approaching state can be notified to the rider.

In addition, according to a fifth feature of the present invention, the first notification device includes a vibrator that vibrates a part corresponding to the location of the obstacle among a plurality of predetermined parts with which the rider makes contact. Since the first notification device includes the vibrator that vibrates the part corresponding to the location of the obstacle among the plurality of predetermined parts with which the rider makes contact, the approaching state of the obstacle can be notified intuitively through a tactual sense of a portion of the rider's body which contacts the vehicle body.

In addition, according to a sixth feature of the present invention, the vibrator is configured to vibrate a right hand part of the rider when the obstacle is located on a front right side of the vehicle, to vibrate a left hand part of the rider when the obstacle is located on a front left side of the vehicle, to vibrate a right foot part of the rider when the obstacle is located on a rear right side of the vehicle, and to vibrate a left foot part of the rider when the obstacle is located on a rear left side of the vehicle. Therefore, the state that the obstacle is located on the front right side or on the front left side can be notified by vibrators provided on the steering handle and the fuel tank of the two-wheeled motorcycle, for example. In addition, the state that the obstacle is located on the rear right side or the rear left side can be notified by the vibrators provided on a seat and a footrest step, for example.

In addition, according to a seventh feature of the present invention, there is provided an indicator as a second notification device, wherein the indicator is operated in accordance with detection of the approaching state. Accordingly, it is possible to predict the approaching state of the obstacle through visual sensation before the winker operation resistance increasing device and the first notification device are operated, so that recognition effects of the operation resistance increasing device and the first notification device following it can be improved. In addition, in the case where the operation resistance increasing device and the first notification device do not work in conjunction with the indicator, something wrong with the operation resistance increasing device and the first notification device can be detected.

In addition, according to an eighth feature of the present invention, the winker manipulator is supported on a handle switch that is fixed on a steering handle of the vehicle, and the operation resistance increasing device is configured to increase the operation resistance by pressing force of a plunger of a solenoid. Therefore, by using the solenoid, which is easy to adjust the pressing force by the plunger, the operation resistance can be increased in addition to the operation resistance under normal conditions. As a result, the operation resistance increasing device can be easily provided without making changes in a normal switch construction in a large way.

In addition, according to a ninth feature of the present invention, the plunger is arranged in parallel with and in the vicinity of an elastic member, which causes the operation resistance in the winker manipulator. Accordingly, the operation resistance increasing device can be arranged efficiently within the handle switch having a less surplus space.

BRIEF DESCRIPTION OF THE DRAWINGS

These and further features of the invention will be apparent with reference to the following description and drawings, wherein:

FIG. 10 is a side view of the winker manipulator;

FIG. 11 is a top plan view of the motorcycle showing arrangement of vibrators.

DETAILED DESCRIPTION OF THE INVENTION

Figure 1:
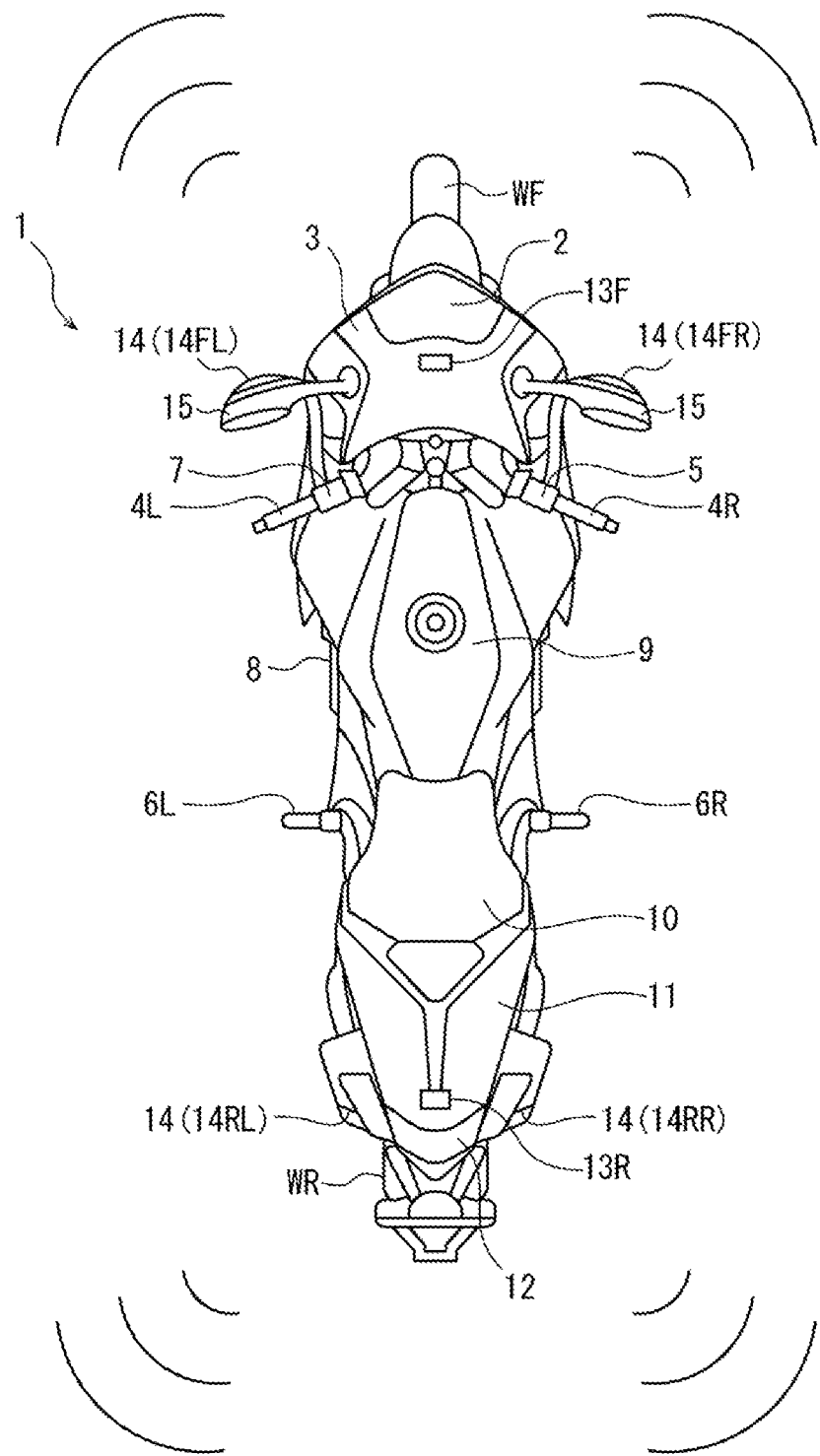
FIG. 1 is a top plan view of a two-wheeled motorcycle to which an approach notification device of a straddle type vehicle in accordance with an embodiment of the present invention is applied.

Hereinafter, a preferred embodiment of the present invention will be described with reference to the drawings. FIG. 1 is a top plan view of a two-wheeled motorcycle 1 to which an approach notification device of a straddle type vehicle in accordance with an embodiment of the present invention is applied. The motorcycle 1 is the straddle type vehicle in which a rear wheel WR is driven by a driving force of an engine 8 located in a middle lower part of a vehicle body and a front wheel WF is steered by a steering handle 4L, 4R in order for traveling.

A front cowl 3 in which a head light 2 is embedded is arranged in front of the steering handle 4L, 4R. Rear-view mirrors 15 in which a winker device 14 on a front side is arranged are mounted on left and right parts of the front cowl 3. Moreover, on the left steering handle 4L there is mounted a handle switch 7 which has a winker switch as a winker manipulator, and the like. On the right steering handle 4R there is mounted a handle switch 5 having a starter switch and the like.

In the rear of the steering handle 4L, 4R, a fuel tank 9 is arranged in such a way as to cover the engine 8. A seat 10 for allowing a driver to be seated is located in the rear of the fuel tank 9. A pair of left and right footrest steps 6L, 6R is provided in a lower position of the vehicle body below the seat 10. The winker device 14 on the rear side is located on a rear end portion of a seat cowl 11 which supports the seat 10 and near a brake light 12. The winker device 14 is configured in such a way that light emitting sections 14FR, 14RR flash on and off at the same time when the winker manipulator is operated to the right, and light emitting sections 14FL, 14RL flash on and off at the same time when the winker manipulator is operated to the left.

The motorcycle 1 of this embodiment is provided with a front obstacle detection device 13F and a rear obstacle detection device 13R composed of a millimeter wave radar and a camera in order to detect a position of an obstacle, such as another vehicle or the like. The front obstacle detection device 13F is mounted on the front cowl 3 above the head light 2, and the rear obstacle detection device 13R is mounted on an upper surface of the seat cowl 11. These front and rear obstacle detection devices 13F, 13R are configured to detect an approaching state of the obstacles such as another traveling vehicle, another stopping vehicle, a structure such as a side wall, a median strip, etc., a fallen object, a bicycle, a pedestrian or the like. The configuration and arrangement of these front and rear obstacle detection devices 13F, 13R may be changed or modified variously.

Figure 2:
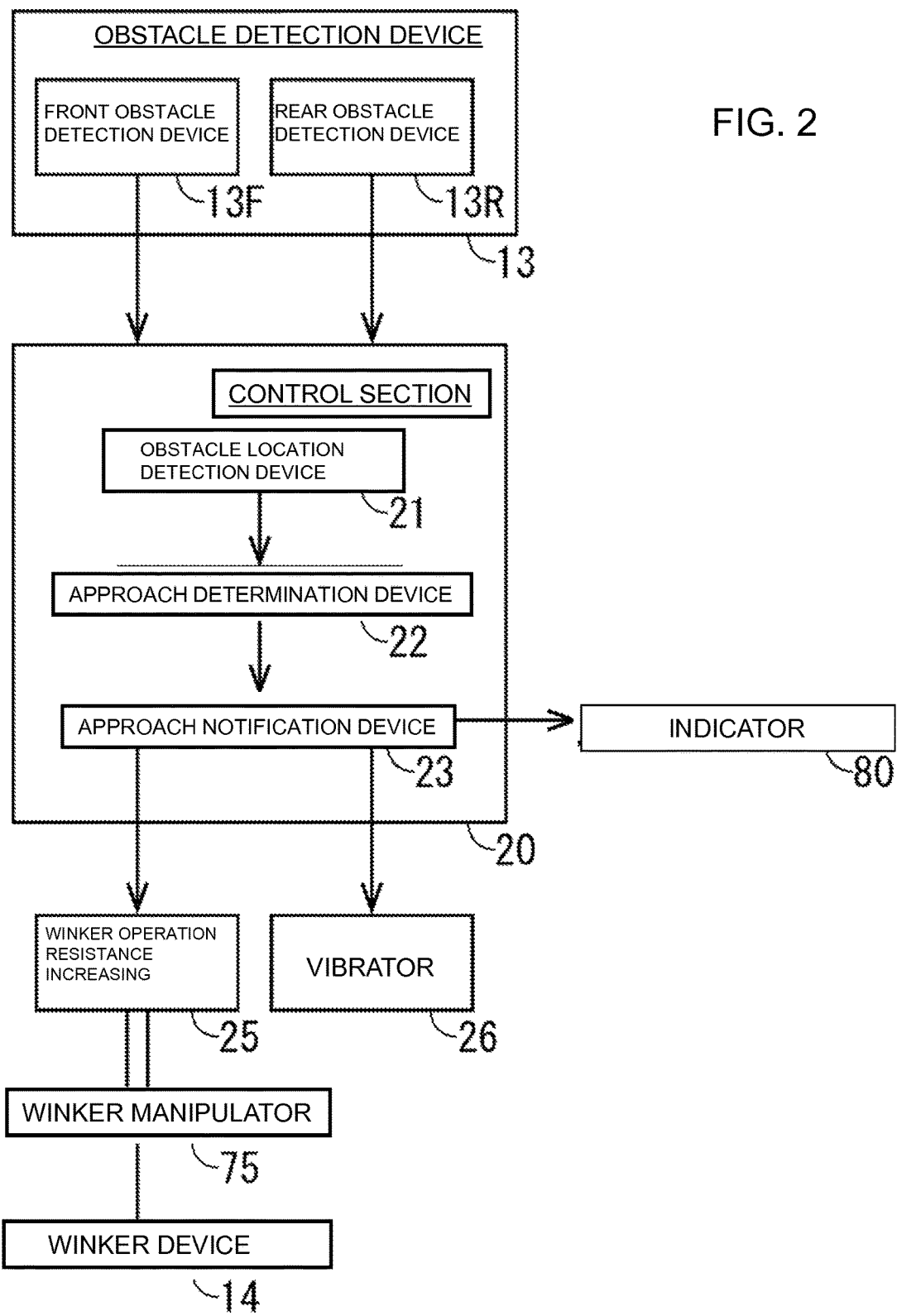
FIG. 2 is a block diagram showing an entire configuration of the approach notification device of the straddle type vehicle.

FIG. 2 is a block diagram showing an entire configuration of the approach notification device of the straddle type vehicle. A control section 20 includes an obstacle location detecting device 21, an approach determination device 22 and an approach notification device 23. The obstacle location detecting device 21 detects a location of the obstacle based on an output information of the obstacle detecting device 13 consisting of the front and rear obstacle detecting devices 13F, 13R. In addition, the approach determination device 22 determines whether or not to be in the approaching state based on a distance from the vehicle to the obstacle.

The approach notification device 23 notifies the rider of the approaching state of the obstacle via an indicator 80 as a second notification device, a winker operation resistance increasing device 25, and a vibrator 26 as a first notification device when a predetermined condition is satisfied.

At the time of notification of the approaching state, first, the information that the approaching state is determined is notified by the indicator 80, and then, the resistance is applied to the winker manipulator 75 when the winker device 14 is about to be operated in the direction of the location of the obstacle during the notification by the indicator 80. Further, during the notification by the indicator 80 and during the operation of the winker device 14, the vibrators 26 provided on each part of the vehicle body are operated. The details of the approach notification will be referred to later.

The winker operation resistance increasing device 25 acts on the winker manipulator 75 for operating the winker device 14 and is configured to notify the rider of the approaching state by increasing the operation resistance of the winker manipulator 75.

Figure 3:
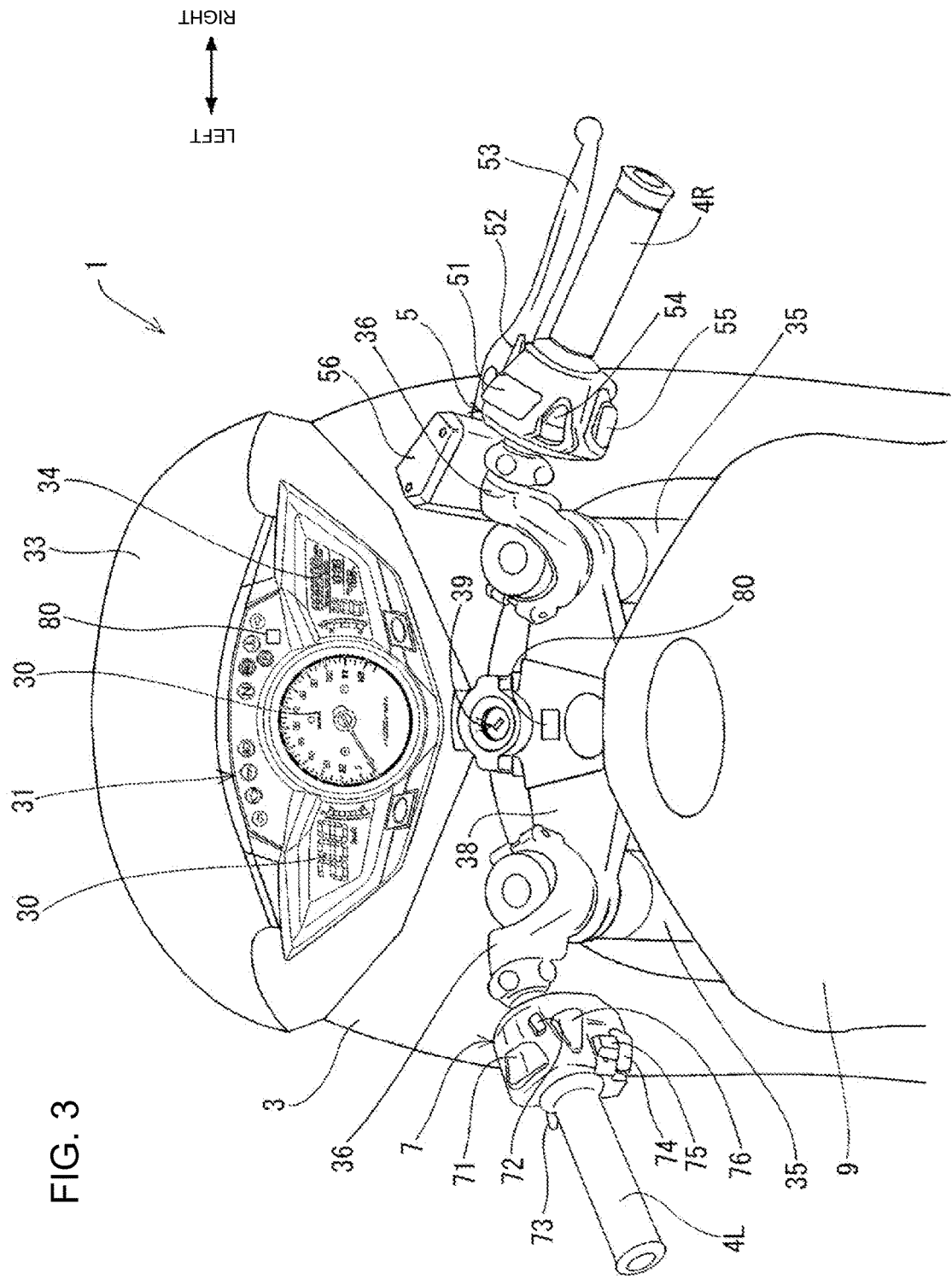
FIG. 3 is an enlarged perspective view showing a part around a handle of the motorcycle.

FIG. 3 is an enlarged perspective view showing a region around the handle of the motorcycle 1. This drawing is viewed from a rear upper side of the vehicle body and shows a state as seen from the rider seated on the seat 10.

Left and right steering handles 4L, 4R for steering the front wheel WF is covered at the front side thereof by the front cowl 3 as an exterior equipment. A transparent or semitransparent windbreak screen 33 is mounted on a middle upper part of the front cowl 3. Under the windbreak screen 33, there is arranged a meter unit 31 which has a tachometer 32, a speed meter 30, and a liquid crystal display panel 34 capable of displaying a fuel level gauge, a clock and the like.

The front wheel WF of the motorcycle 1 is pivotally carried on a lower end of left and right front forks 35. Upper portions of the front forks 35 are connected to and fixed on a top bridge 38 to which a key cylinder 39 is attached. The top bridge 38 is rotatably mounted on a vehicle body frame of the motorcycle 1 through a steering stem (not shown). The steering handles 4L, 4R are fixed on upper end portions of the front forks 35 through handle clamps 36. The fuel tank 9 is arranged between the top bridge 38 and the seat 10.

The indicator 80 which performs the approach notification of the obstacle in accordance with the approach notification device of the present invention is located in a proper optional position visible to the rider such as a display region of the meter unit 31 or an upper surface of the top bridge 38 or the like. In particular, in the case where the indicator 80 is fitted to the upper surface of the top bridge 38, it can be fitted later to an existing vehicle without changing or modifying the meter unit.

A front wheel brake lever 53 is arranged on the front side of the right steering handle 4R in the longitudinal direction of the vehicle body. A reserve tank 56 for reserving a hydraulic fluid of a hydraulic brake system is attached to a basal part of the front wheel brake lever 53. Moreover, a handle grip of the right steering handle 4R is configured to operate a throttle of a power source by its rotational operation.

The motorcycle 1 is provided with an automatic transmission which does not require an operation of a clutch and configured to perform automatic traveling capable of traveling only by the operation of the throttle and semi-automatic traveling capable of traveling by optional speed change operation. In addition, at the time of this semi-automatic traveling mode, the speed change operation can be implemented by a shift-up/shift-down switch provided in the handle switch to be referred to later. A sequential multi-step transmission in which speed change gears and a clutch are operated by an actuator can be applied to the automatic transmission.

On the right handle switch 5, there is provided an engine stop switch 51, a neutral and drive changeover switch 54, a starter switch 55 and a traveling mode changeover switch 52. On the other hand, on the left handle switch 7, there is provided an optical axis changeover switch 71 of the head light 2, a horn switch 76, a winker switch (winker manipulator) 75, a hazard lamp switch 72, a shift-down switch 74 and a shift-up switch 73 for performing the speed change operation of the automatic transmission.

Figure 4:
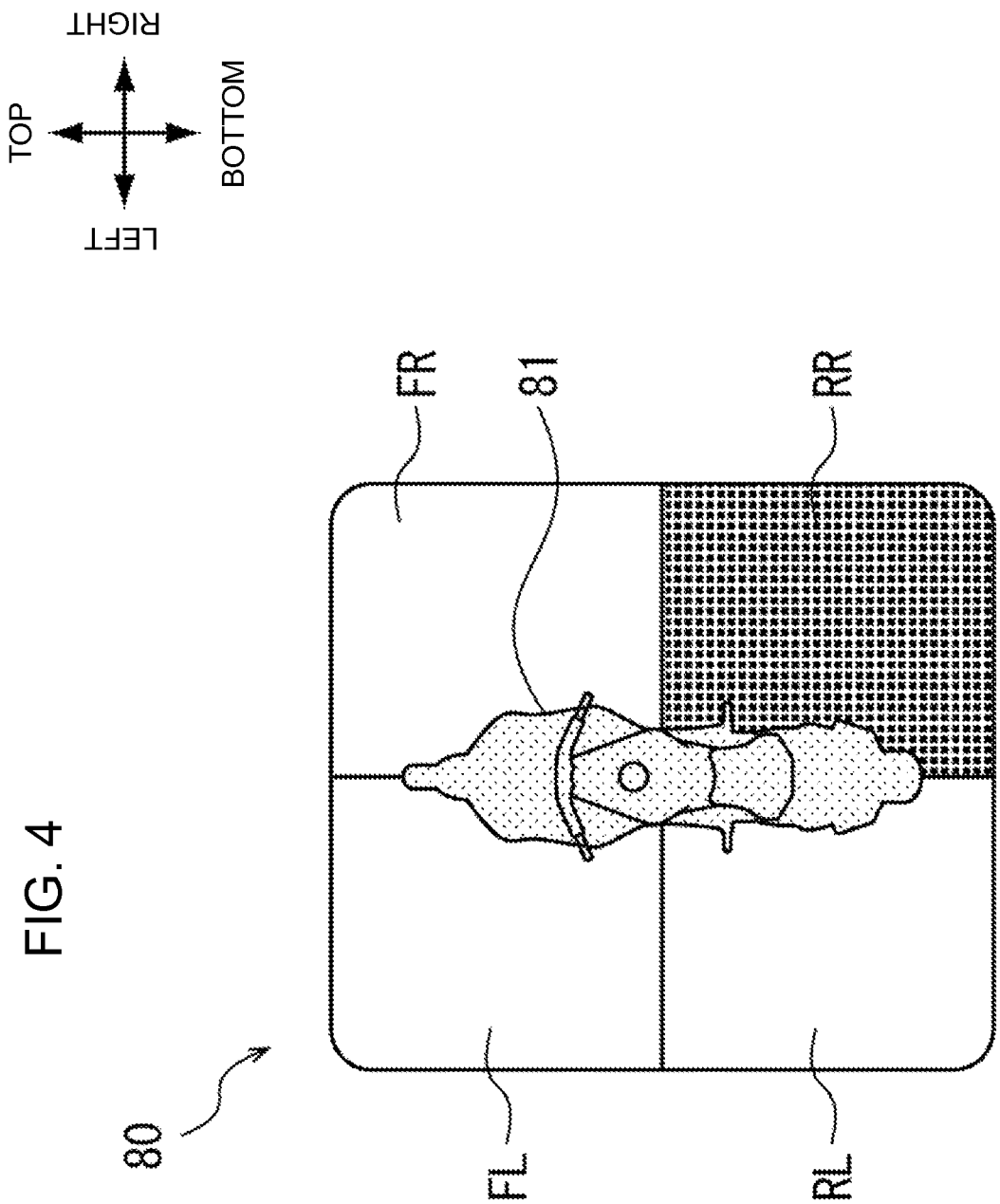
FIG. 4 is a front view of an indicator.

FIG. 4 is a front view of the indicator 80 functioning as the second notification device. In the approach notification device of this embodiment, the obstacles in the forward, backward, left and right directions around an vehicle can be detected with provision of the front obstacle detection means 13F and the rear obstacle detection means 13R, and then, the indicator 80 formed with an LED is configured to notify the rider of the position of the obstacle by four divisions. Namely, when the obstacle approaches from a front right side of the motorcycle 1, an upper right region (division) FR of an vehicle display 81 is operated (lighted or flashed), and when the obstacle approaches from the rear right side, a lower right region (division) RR is operated. In addition, when the obstacle approaches from front left side, an upper left region (division) FL is operated, and when the obstacle approaches from a rear left side, a lower left region (division) RL is operated.

Further, when a series of side walls approaches on the right side for example, the upper right region FR and the lower right region RR are operated at the same time. When a large-sized four-wheeled vehicle approaches from behind, the lower left region RL and the rear right region RR are operated simultaneously. Like this, the approaching conditions can be notified in combination of each of the regions. By the way, the four divisions are employed in this embodiment, the number of divisions may be increased to six directions or eight directions in accordance with detection accuracy of the obstacle detection means 13F, 13R.

Further, the indicator 80 may be configured to change its operation mode in accordance with circumstances in such a way that the flashing interval is shortened with decrease in the distance to the obstacle.

Figure 5:
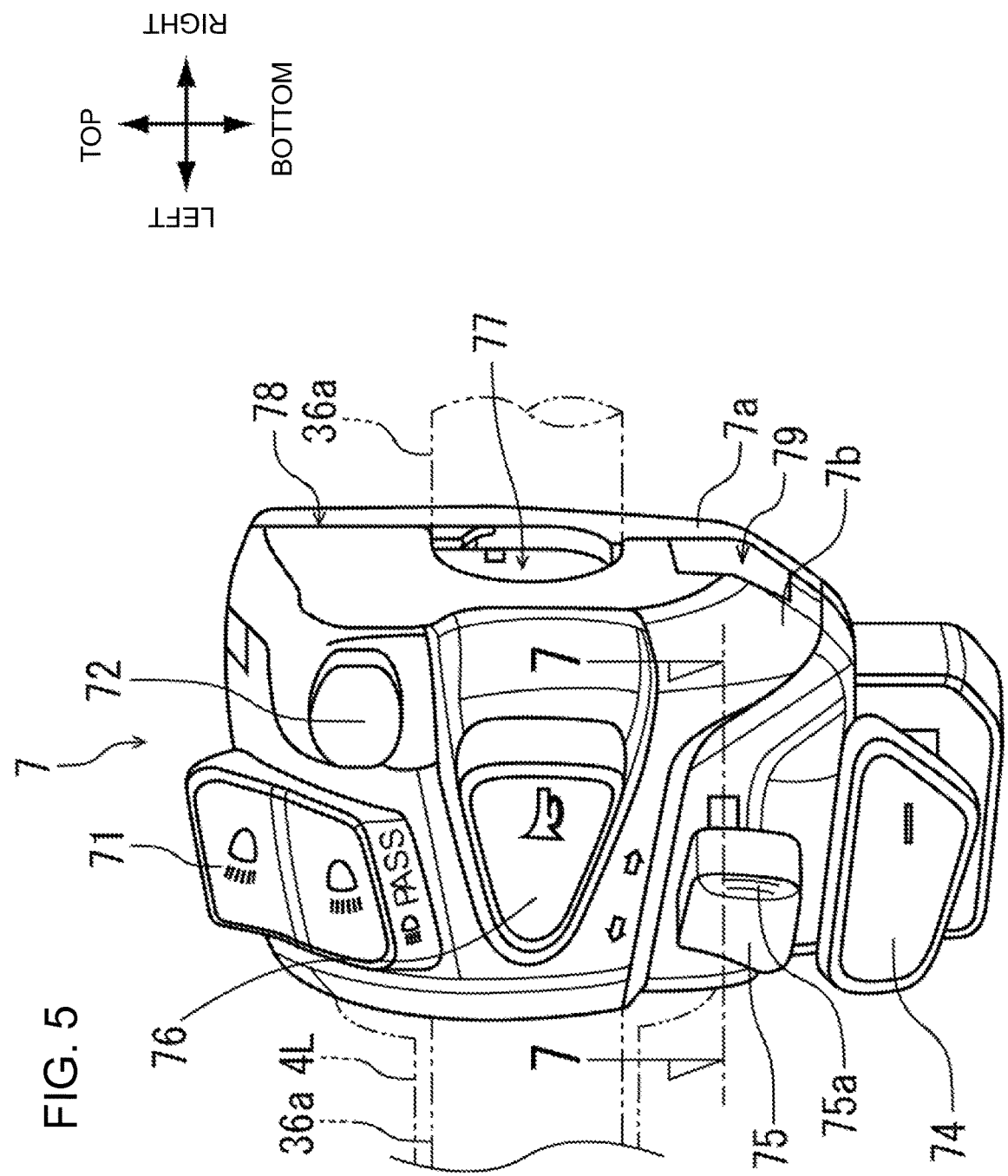
FIG. 5 is a perspective view of a handle switch as seen from a driver side.
Figure 6:
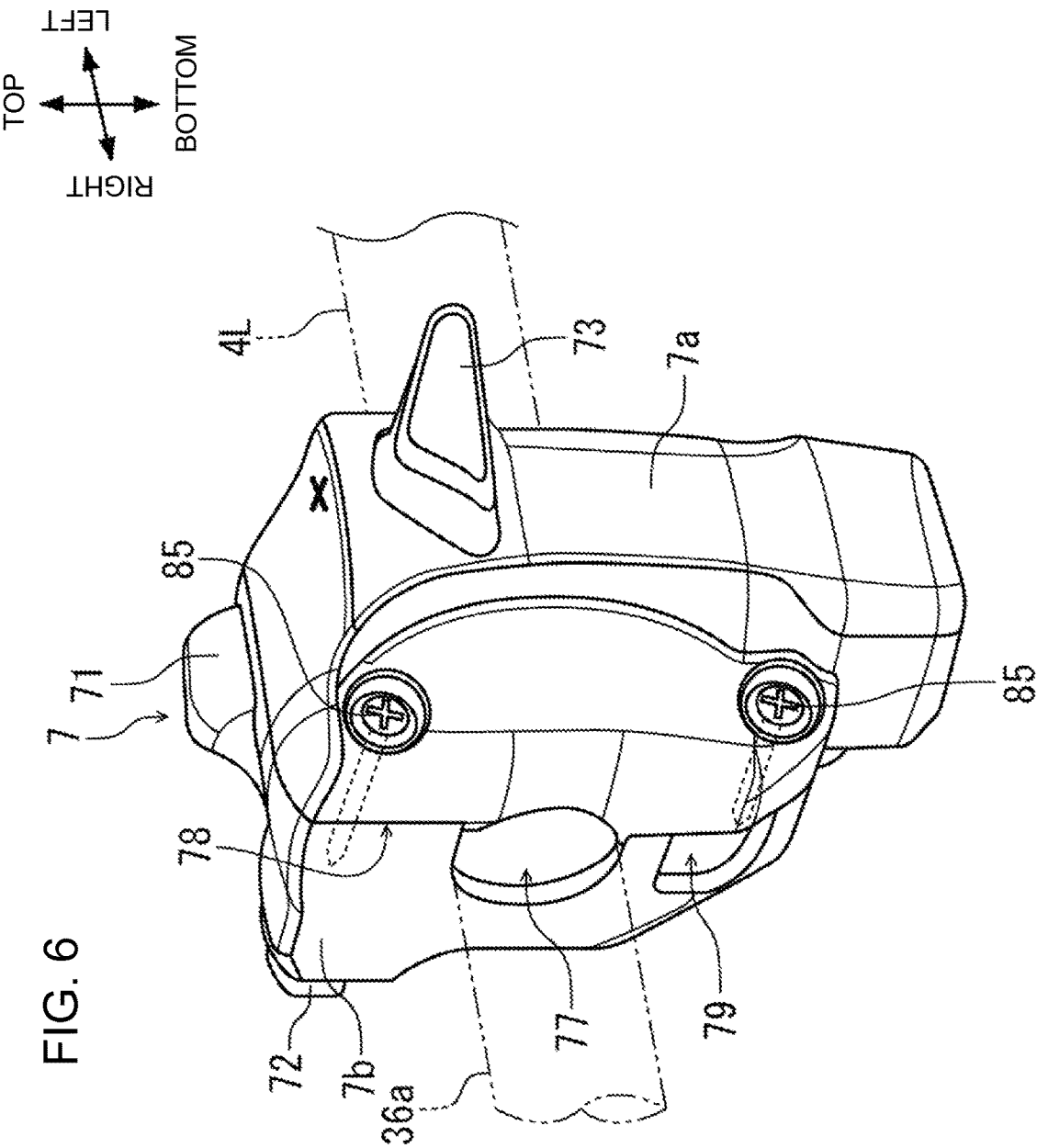
FIG. 6 is a perspective view of the handle switch as seen from a front side of a vehicle body.

FIGS. 5 and 6 are perspective views of the left handle switch 7. The handle switch 7 is fixed on the steering handle 4L in such a way that a pair of half switch cases sandwiches a handle bar 36a of metal pipe from both front and rear sides so as to be connected to each other. The switch cases are formed with a clamp hole 77 for sandwiching the handle bar 36a.

The horn switch 76 of a swingingly pressing type is arranged substantially on the same level with the handle bar 36a. An optical axis change-over switch 71 of a seesaw switching type is arranged above the horn switch 76. On the right side in the vehicle width direction of the optical axis change-over switch 71 there is arranged a hazard lamp switch 72 of which ON and OFF states are changed by allowing its manipulator to project or sink. Below the horn switch 76 there is arranged the winker switch (winker manipulator) 75, which is configured to operate a direction indicator by being tilted leftward and rightward.

The optical axis change-over switch 71 is of seesaw type that is swingable around a swing shaft. When the optical axis change-over switch 71 is swung forwardly of the vehicle body, an optical axis of a headlamp is directed upward to be changed over into a high beam, and when it is swung rearwardly of the vehicle body, the optical axis of the headlamp is directed downward to be changed over into a low beam. Moreover, when it is further pressed from a position of the low beam toward the rider side, a passing light by the high beam is able to be operated. In addition, the horn switch 76 has a swing shaft at an outward end thereof in the vehicle width direction and is configured to be swung when an operating surface on an inward side of the vehicle body is pushed forwardly of the vehicle body.

The switch case of a box shape made of injection molded resin or the like has a two-piece construction and consists of a front case half body 7a located on the front side of the vehicle body and a rear case half body 7b located on the rear side (rider side) of the vehicle body. These case half bodies 7a, 7b are combined with each other by two fastening bolts 85 to be inserted from a front side of the front case half body 7a. With this combination, the casing half bodies 7a, 7b are connected to each other at a divided surface 78 and the handle switch 7 is fixed on the handle bar 36a. An outlet port 79 for a harness bundling wires, which are connected to each of the switches, is provided below the clamp hole 77 located inward in the vehicle width direction.

The shift-up switch 73 provided on the front case half body 7a is configured to be fit for manipulation to pull the shift-up switch 73 to this side with the index finger of the left hand, which has held the steering handle 4L covered with a rubber grip. On the other hand, the shift-down switch 74 provided on the rear case half body 7b is configured to be fit for manipulation to push the shift-down switch 74 with the thumb of the left hand.

Figure 7:
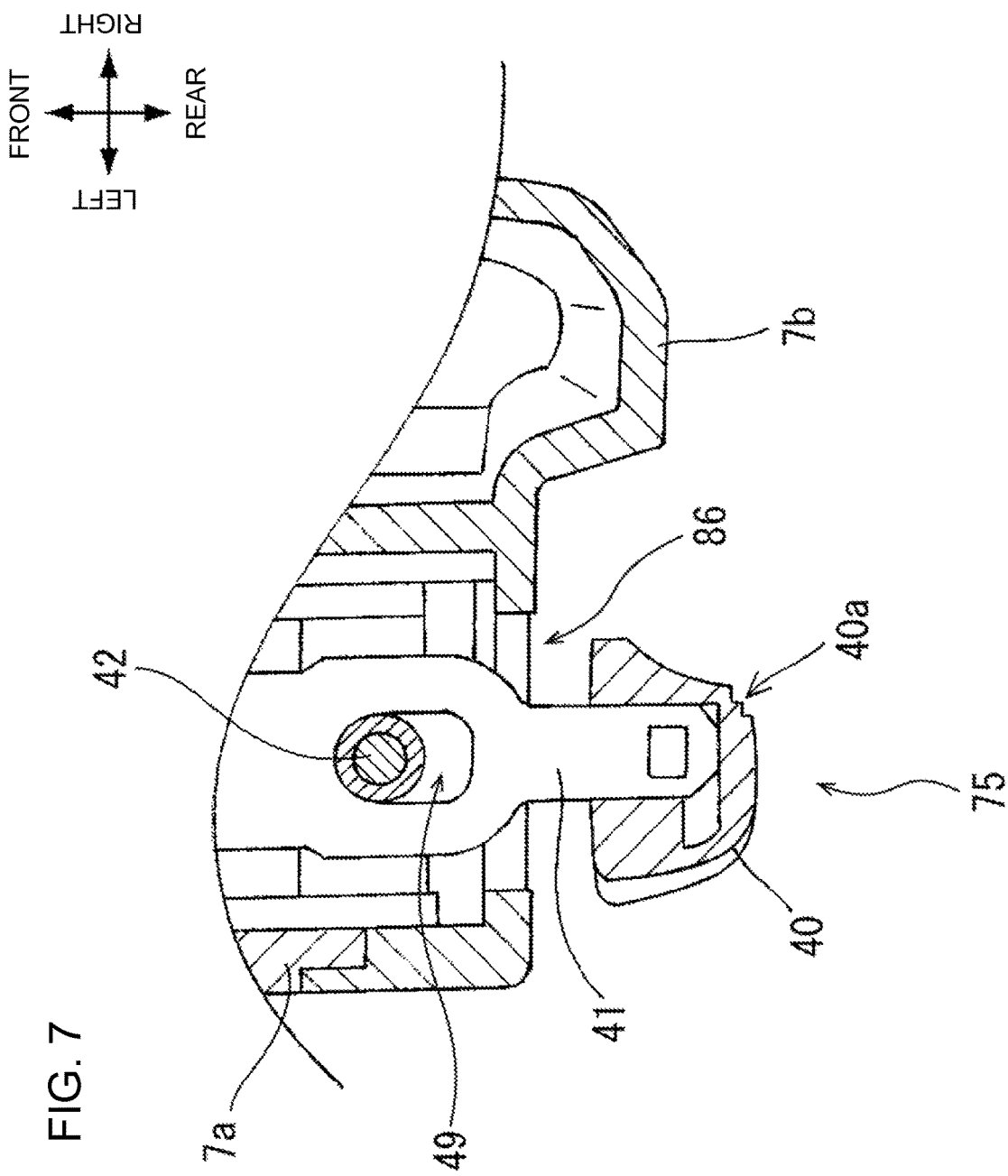
FIG. 7 is a cross sectional view taken on line 7-7 of FIG. 5.
Figure 8:
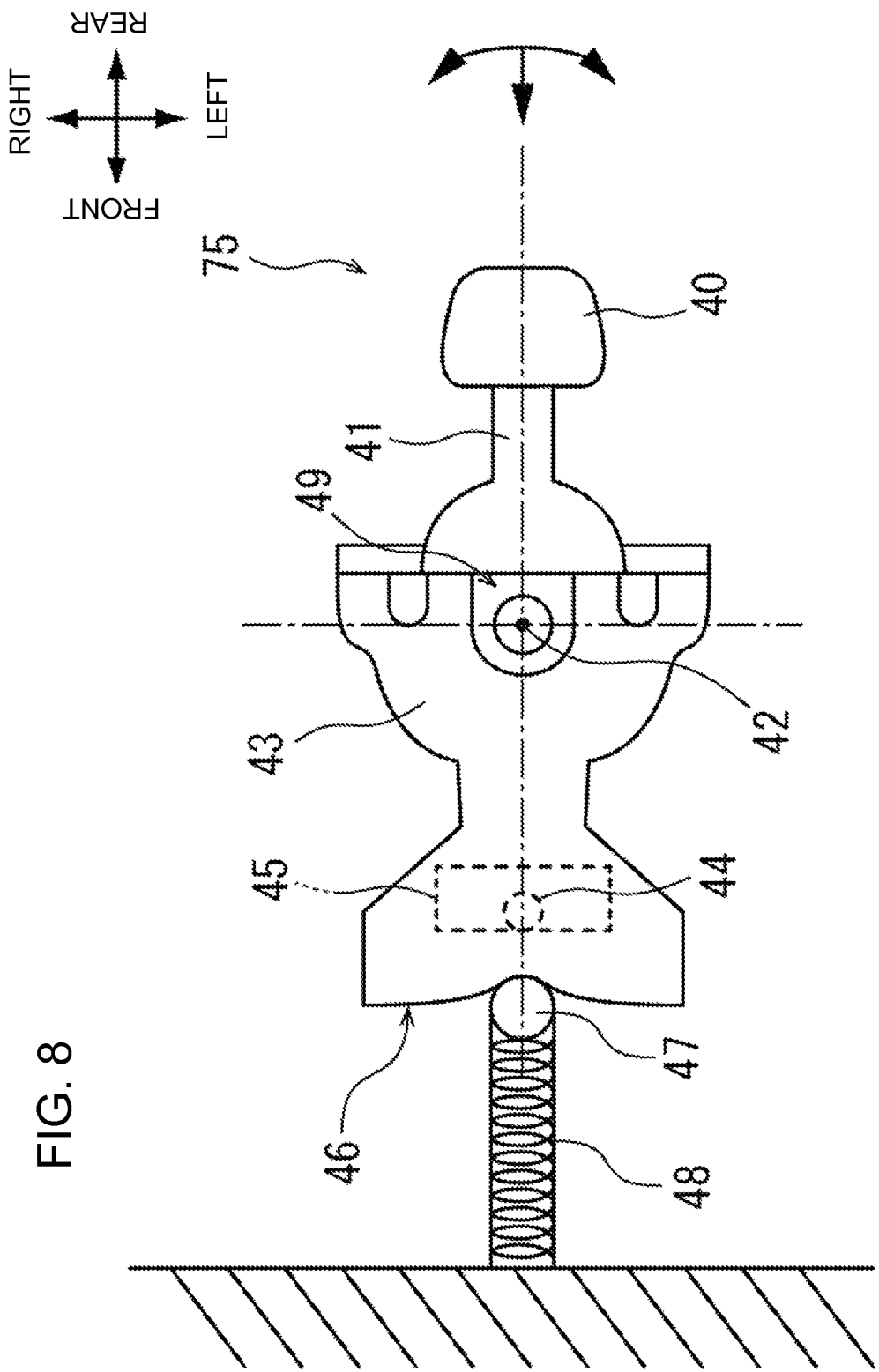
FIG. 8 is a plan view showing a movement of a winker manipulator (in a neutral position)
Figure 9:
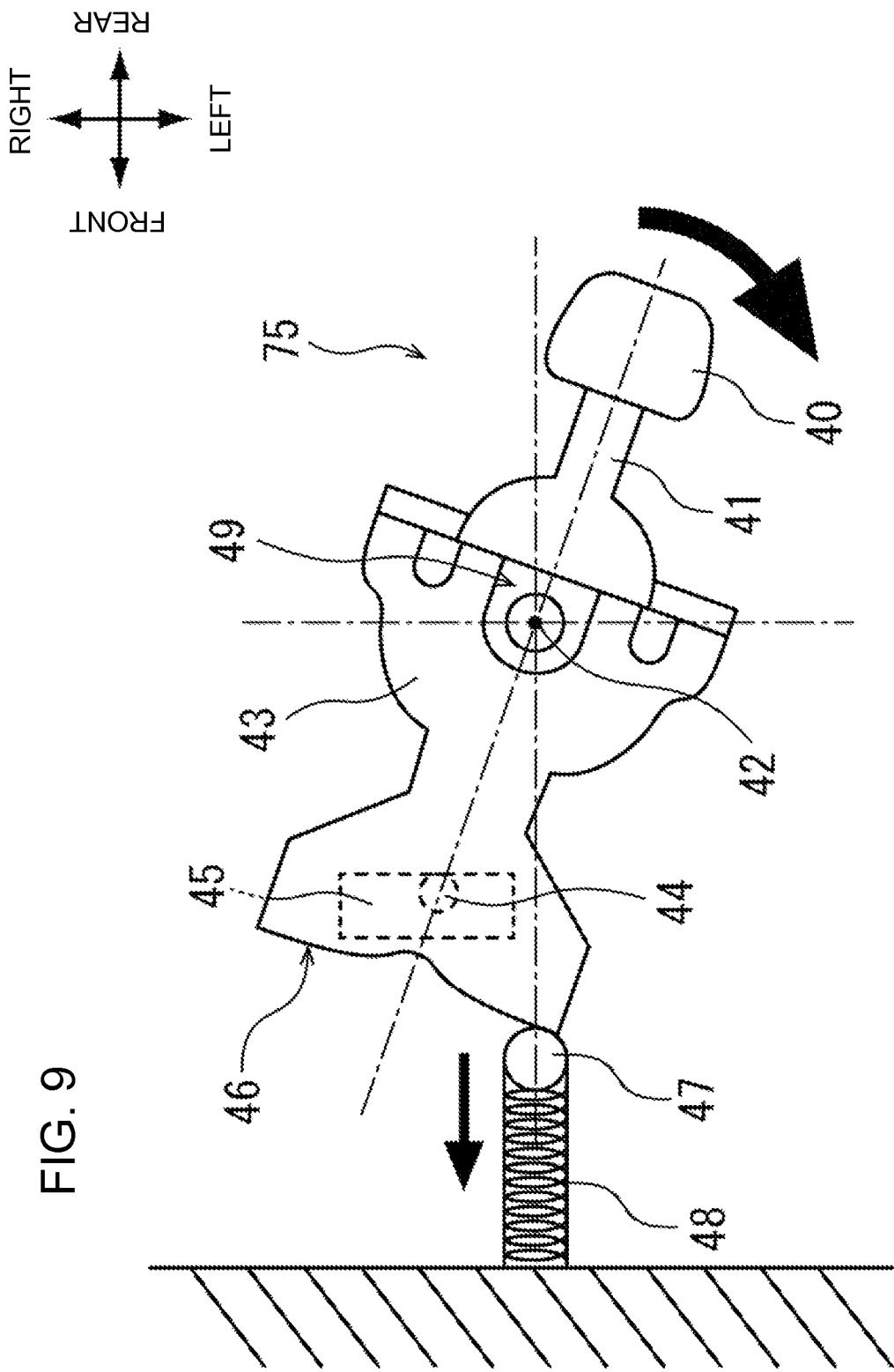
FIG. 9 is a plan view showing the movement of the winker manipulator (in a leftward tilted position)

FIG. 7 is a cross sectional view taken on line 7-7 of FIG. 5. In addition, FIGS. 8, 9 and 10 are views of assistance in explaining the construction of the winker switch (winker manipulator) 75. The winker manipulator 75 includes a main body section 43 formed by a flat member, an operation knob 40 with which the thumb of the rider makes contact, and a flat connecting section 41 that provides a connection between the operation knob 40 and the main body section 43. The main body section 43 and the connecting section 41 are made of metal and formed integral with each other. The operation knob 40 is made of hard resin.

Outwardly projecting portions of the winker manipulator 75 are only two elements consisting of the connecting section 41, which passes through a slot 86 formed in the rear case half body 7b, and the operation knob 40 provided with a plurality of non-slip grooves 40a. The winker device 14 is operated when the winker manipulator 75 is tilted to either of left and right sides and is stopped when the winker manipulator 75 is pressed forwardly of the vehicle body. The left and right tilting motion of the winker manipulator 75 is carried out by rotation around its rotation shaft 42. The rotation shaft 42 passes through an oblong hole 49 formed in the main body section 43 of the winker manipulator 75.

FIGS. 8 and 9 are plan views showing the movement of the winker manipulator 75. On the forward side of the oblong hole 49 of the main body section 43 there is formed an engaging projection 44 for allowing a switch terminal 45 to slide thereon. On the forward side of the engaging projection 44 there is formed a front end surface 46.

The front end surface 46 of the winker manipulator 75 is always pressed rearwardly by a steel ball 47, which contacts an elastic member 48 such as a coil spring or the like. The resilient force for pressing the operation knob 40 forwardly is energized by this elastic member 48.

Further, in the case of operating the winker manipulator 75, a contact position of the front end surface 46 relative to the steel ball 47 changes in accordance with the rotation of the winker manipulator 75 around the rotation shaft 42. Accordingly, when the steel ball 47 moves forwardly to compress the elastic member 48, the resilient force in the direction to return the winker manipulator 75 to a neutral position, namely, the operation resistance is created.

FIG. 10 shows a side view of the winker manipulator 75. In this embodiment, a second main body section 43a having a similar shape to the main body section 43 is located below the main body section 43. The winker manipulator 75 is configured in such a way that pressing force by a solenoid 60 can be energized or applied to a front end surface 46a of the second main body section 43a.

With arrangement of this solenoid 60 functioning as the winker operation resistance increasing device 25, the rider can be notified intuitively by the feeling of a fingertip that various kinds of obstacles such as another vehicle, a pedestrian, a fallen object, a side wall and the like are located in the direction intended to change a route.

The solenoid 60 functioning as the winker operation resistance increasing device 25 (see FIG. 2) in this embodiment includes a coil 62 and a plunger 61 inserted in the coil 62. The plunger 61 is located in a position shown by (a) in a state in which current is not applied to the coil 62, and is spaced apart from the second main body section 43a. On the other hand, when the current is applied to the coil 62, the plunger 61 moves to a rearward position as shown by (b) by electromagnetic force produced by the coil 62. Then, the plunger 61 moving rearwardly comes into contact with the second main body section 43a on the way to the rearward position. However, since it is possible to press back with respect to pressing force of the plunger 61, the energizing force similar to the elastic member 48 is created. This energizing force becomes an increment of the operation resistance.

The plunger 61 is arranged in parallel with and in a vicinity of the elastic member 48 which applies the operation resistance to the winker manipulator 75. Therefore, the operation resistance increasing device 25 can be efficiently arranged in an interior of the handle switch 7, which has a less surplus space. Moreover, since the solenoid 60 is used for the operation resistance increasing device 25, an increase of the operation resistance in addition to the normal operation resistance can be achieved by means of the solenoid 60 which is capable of easily performing the adjustment of the pressing force (electromagnetic force) by the plunger 61. Accordingly, the operation resistance increasing device 25 can be easily provided without changes or modifications of the switch construction.

With the above described construction, the approach notification device 23 (see FIG. 2) operates the winker operation resistance increasing device 25. Namely, when the solenoid 60 is turned on, the operation resistance at the time of tilting the winker manipulator 75 can be increased. By the way, in this embodiment, although a tip of the plunger 61 is formed in a hemispherical shape so as to smoothly contact the front end surface 46a, a steel ball may be carried on the tip of the plunger 61, for example. In addition, in this embodiment, although the main body section 43 and the second main body section 43a are formed by two parallel extending plates, a surface with which the plunger 61 makes contact may be formed by expanding the front end surface 46 of the main body section 43.

FIG. 11 is a top plan view of the motorcycle showing locations of the vibrators 26, wherein reference characters identical to FIG. 1 designate like or corresponding parts. In this embodiment, four pairs of left and right vibrators 26 that are operated by the approach notification device 23 are arranged with the individual vibrators 26 of each pair transversely spaced from one another and each pair longitudinally spaced from the next pair.

To be concrete, the four pairs of vibrators 26 consist of a pair of left and right first vibrators 90L, 90R (located at a left hand part and a right hand part) provided on the left and right steering handles 4L, 4R, a pair of left and right second vibrators 91L, 91R (located at a left thigh part and a right thigh part) provided in a narrow part of the fuel tank 9, a pair of left and right third vibrators 92L, 92R (located at a left sole part and a right sole part) provided in the footrest steps 6L, 6R, and a pair of left and right fourth vibrators 93L, 93R (located at a left buttock part and a right buttock part) provided in the seat 10.

The approach notification device 23 is configured to operate the right first vibrator 90R and the right second vibrator 91R when the obstacle is approaching from a front right side of the motorcycle 1, to operate the right third vibrator 92R and the right fourth vibrator 93R when the obstacle is approaching from a rear right side of the motorcycle 1, to operate the left first vibrator 90L and the left second vibrator 91L when the obstacle is approaching from a left front side of the motorcycle 1, and to operate the left third vibrator 92L and the left fourth vibrator 93L when the obstacle is approaching from a rear left side of the motorcycle 1. Thus, the approach notification device 23 can effectively notify the rider of the approaching states containing the front and rear directions.

The vibrator is not limited to the above described example but may be disposed on various kinds of articles with which the rider makes contact. The hands, buttocks, thigh and head are conceivable as parts of the rider's body. In correspondence with this, the approach of the obstacle may be notified by a helmet to the head, by a handle switch to the hands and by a pair of special trousers or the like with a built-in vibrator to the thigh.

Figure 12:
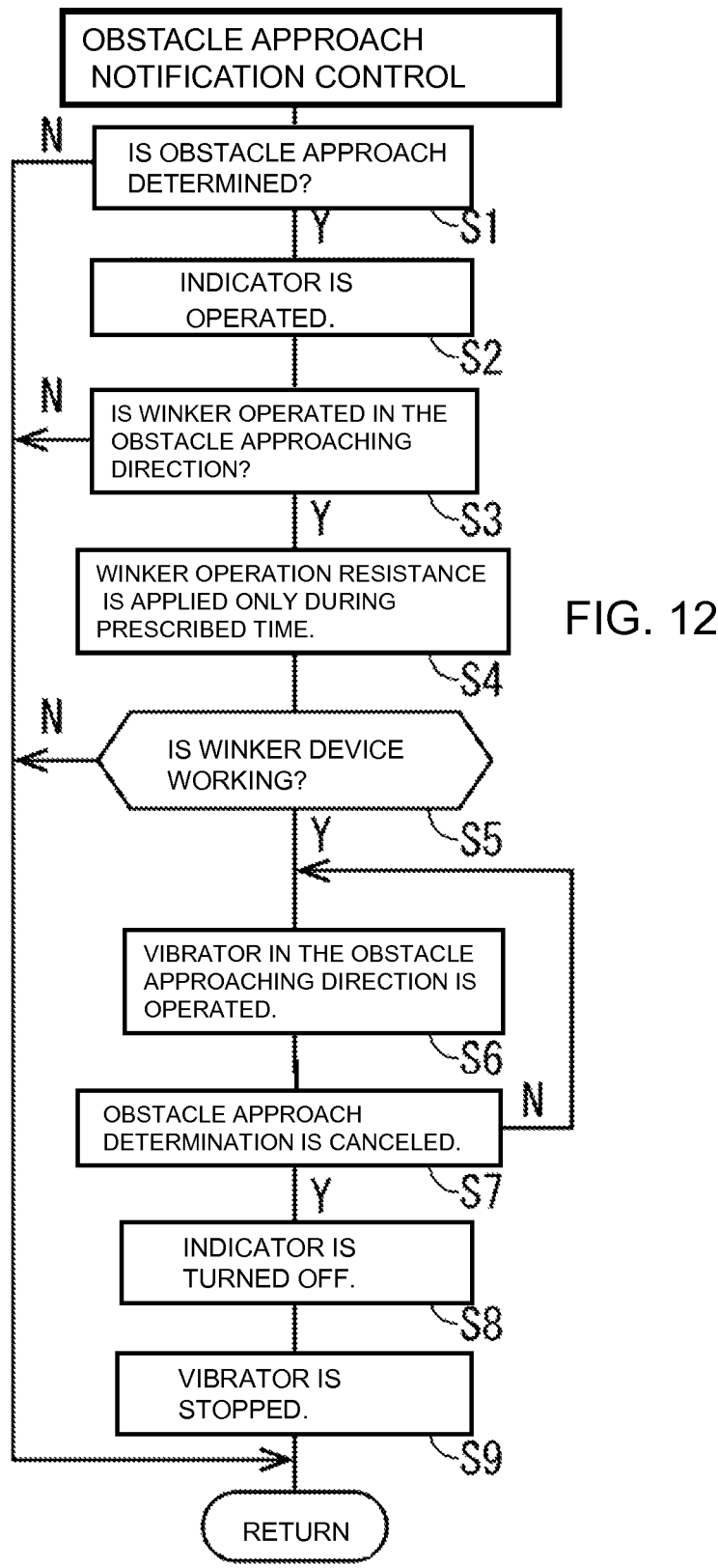
FIG. 12 is a flowchart showing a procedure of an obstacle approach notification control.

FIG. 12 is a flowchart showing a procedure of an obstacle approach notification control in accordance with this embodiment. The following explanation will be made as an example in the case of detecting the approach of another vehicle which travels in the same direction as the traveling direction of the vehicle.

In a step S1, it is determined whether or not an obstacle approach determination that another vehicle is located within a predetermined distance is made by the approach determination device 22. When an affirmative determination is made in the step S1, the procedure proceeds to a step S2 and the indicator 80 (see FIG. 4) is operated. When another vehicle travels within the predetermined distance in the forward right direction for example, the upper right region FR of the indicator 80 is lighted. When a negative determination is made in the step S1, a series of control procedures is ended.

In a step S3, it is determined whether or not the winker manipulation is performed in the obstacle approaching direction. For example, when another vehicle travels within the predetermined distance in the forward right direction, it is determined whether or not the rightward tilting operation of the winker manipulator 75 is started. The determination as to whether or not the rightward tilting operation of the winker manipulator 75 is started is able to be executed based on an output of a sensor which detects the position of the winker manipulator 75, an output of a pressure sensor built in the operation knob 40, or an energization state of the switch contact 44 slidably operated by the winker manipulator 75. By the way, when the winker operation is performed in the left direction, the negative determination is made.

In the case where the affirmative determination is made, namely, the winker manipulator 75 is operated in the right direction when another vehicle is traveling within the predetermined distance in the forward right direction, the procedure proceeds to a step S4. In the step S4, the approach notification device 23 energizes the solenoid 60 only during a predetermined time interval, so that the operation resistance of the winker manipulator 75 is increased. In this embodiment, since the energization time is limited to the predetermined time, the feeling of resistance is given only during operation of the winker manipulator 75, whereby the following returning operation or the like is not influenced by the operation resistance.

By the way, as described above, in the case where the winker operation is performed in the left direction at the time of the determination of the step S3, the operation resistance is not increased. This is because there is no influence on the route change to the left side when another vehicle is traveling within the predetermined distance in the forward right direction.

Consequently, the step S3 corresponds to the control at the time of operation (namely, the moment at which the manipulator is operated). In the next following step S5, it is determined whether or not the winker device 14 is working (the lamp is flashing). When the determination is affirmative, the procedure proceeds to a step S6. Herein, the determination is negative in the steps S3 and S5, a series of control procedures is ended.

Then, in the step S6, the vibrator 26 located in the obstacle approaching direction is operated. Namely, in the case where the winker manipulator 75 is tilted to the right side when another vehicle is traveling within the predetermined distance in the forward right direction and therefore the winker devices 14FR, 14RR (see FIG. 1) on the right side have started to flash, the vibrator 26 corresponding to the forward right direction is operated.

As the operation mode of the vibrator 26, the right first vibrator 90R and the right second vibrator 91R are operated continuously, for example. Alternatively, the vibrators 26 may be configured to vibrate intermittently at the beginning and to be sifted gradually to the continuous vibration with the approach of another vehicle.

In the following step S7, it is determined whether or not the determination of the obstacle approach by the approach determination means 22 is canceled. For example, when another vehicle leaves from within the predetermined distance in the forward right direction without reference to the movement of any of another vehicle and the vehicle in the state that the indicator 80 and the vibrator 26 are working, the determination of the obstacle approach is canceled, so that the affirmative determination is made. In addition, the determination may be canceled by the recognition of the rider. For example, by pushing a winker cancelling button, the rider may stop the operation of the vibrator. As a result, after having recognized the approach, the vibration can be stopped at the rider's option. On the other hand, when the determination is negative in the step S7, the procedure retunes to the step S6 whereby the operation of the vibrator 26 is continued.

When the affirmative determination is made in the step S7, the indicator 80 is turned off in a step S8 and then the vibrator is stopped in a step S9, so that a series of control procedures is ended. Herein, in the case where the winker device 14 is tuned off in the state that the indicator 80 and the vibrator 26 are working, the vibrator 26 is stopped but the determination of the obstacle approach is not canceled, so that the operation of the indicator 80 is continued. By the way, even in this case, the indicator 80 may be configured to stop its operation in concurrence with the turning-off of the winker device 14.

In the above first embodiment, although the approach notification is performed by the winker operation resistance increasing device 25 of the winker manipulator 75, the indicator 80 and the vibrator 26, the approach notification device may be formed only by the indicator 80 and the vibrator 26 without provision of the winker operation resistance increasing device 25.

Further, the vibrator 26 may be configured in such away as to be operated on condition that the winker device is working in the direction of location of the obstacle only. Namely, in the case where the winker device is operated and thereafter another vehicle enters within the predetermined distance during the operation of the winker device, the indicator and the vibrator may be configured to be started at the same time. Moreover, in this case, when another vehicle leaves from within the predetermined distance while the indicator and the vibrator are working, the indicator and the vibrator are turned off at the same time.

As describe above, according to the approach notification device of the straddle type vehicle of the present invention, when the winker manipulator is operated in the direction of the location of the obstacle, the operation resistance of the winker manipulator is increased, so that the approach of the obstacle is notified, and furthermore, when the winker manipulation is continued so as to operate the winker device, the vibrator is operated additionally to notify the rider of the approach of the obstacle. Therefore, the rider can be notified intuitively by the feeling of the fingertip that various kinds of obstacles such as another vehicle, the pedestrian, the fallen object, the side wall and the like are located in the direction intended to change a route.

By the way, the type of the motorcycle, the number and construction of the obstacle detection device, the construction of the winker manipulator, the construction of the winker operation resistance increasing device, types and locations of the indicator and the vibrator, and the like are not limited to those of the above embodiment, and various changes or modifications may be made. For example, the indicators as the second notification device are combined with another indicator means such as an oil temperature, a high beam or the like, in such a way as to be flashed and operated by the motion different from the normal motion. With this configuration, the indicators may be used as attention attracting means while preventing the increase in component parts. The approach notification device of the straddle type vehicle in accordance with the present invention may be applied to various kinds of vehicles such as straddle type three-wheeled vehicle and four wheeled vehicle, or the like without limitation to the two-wheeled motorcycle.

DESCRIPTION OF REFERENCE CHARACTERS

1: Two-wheeled motorcycle (Straddle type vehicle, Vehicle), 4L, 4R: Steering handle, 6L, 6R: Footrest step, 7: Left handle switch, 9: Fuel tank, 10: Seat, 13: Obstacle detection means, 13F: Front obstacle detection means, 13R: Rear obstacle detection means, 14: Winker device, 20: Control section, 21: Obstacle location detecting means, 22: Approach determination means, 23: Approach notification device, 25: Winker operation resistance increasing device, 26: Vibrator (First notification device), 43: Main body section, 43a: Second main body section, 47: Steel ball, 48: Elastic member, 60: Solenoid, 61: Plunger, 62: Coil, 75: Winker manipulator, 80: Indicator (Second notification device)

What is claimed is:

1. An approach notification device of a straddle type vehicle comprising:
   an obstacle detection device that detects an obstacle located around the vehicle;
   an approach determination device that detects an approaching state that the obstacle is located within a predetermined distance from the vehicle; and
   a winker operation resistance increasing device for increasing operation resistance of a winker manipulator of a winker device, which is provided in the vehicle and configured to operate a direction indicator by being tilted leftward and rightward;
   wherein when the approaching state that the obstacle is within the predetermined distance from the vehicle is determined by the approach determination device and the operation of the winker manipulator in the direction of a location of the obstacle is detected, the winker operation resistance increasing device is operated to increase the operation resistance of the winker manipulator,
   wherein the winker manipulator is supported on a handle switch that is fixed on a steering handle of the vehicle, and the operation resistance increasing device is configured to increase the operation resistance by pressing force of a plunger of a solenoid,
   wherein the plunger is operable with an elastic member which causes the operation resistance in the winker manipulator.

2. The approach notification device of the straddle type vehicle according to claim 1, wherein the operation resistance of the winker manipulator is increased only for a predetermined period of time after the operation of the winker manipulator is detected.

3. The approach notification device of the straddle type vehicle according to claim 1, further comprising a first notification device that is configured to start operation under a condition that the approaching state is determined and the winker device is operated in the direction of the location of the obstacle by the operation of the winker manipulator.

4. The approach notification device of the straddle type vehicle according to claim 2, further comprising a first notification device that is configured to start operation under a condition that the approaching state is determined and the winker device is operated in the direction of the location of the obstacle by the operation of the winker manipulator.

5. The approach notification device of the straddle type vehicle according to claim 1 further comprising:

a first notification device configured to start operation under a condition that the winker device is operated in the direction of the location of the obstacle in a condition where the approaching state is determined, wherein the first notification device comprises a vibrator that vibrates a part corresponding to the location of the obstacle among a plurality of predetermined parts with which a rider of the vehicle makes contact, wherein the vibrator is configured to vibrate a right hand part of the rider when the obstacle is located on a front right side of the vehicle, to vibrate a left hand part of the rider when the obstacle is located on a front left side of the vehicle, to vibrate a right foot part of the rider when the obstacle is located on a rear right side of the vehicle, and to vibrate a left foot part of the rider when the obstacle is located on a rear left side of the vehicle.

6. The approach notification device of the straddle type vehicle according to claim 3, wherein the first notification device comprises a vibrator that vibrates a part corresponding to the location of the obstacle among a plurality of predetermined parts with which a rider of the vehicle makes contact.

7. The approach notification device of the straddle type vehicle according to claim 6, wherein the vibrator is configured to vibrate a right hand part of the rider when the obstacle is located on a front right side of the vehicle, to vibrate a left hand part of the rider when the obstacle is located on a front left side of the vehicle, to vibrate a right foot part of the rider when the obstacle is located on a rear right side of the vehicle, and to vibrate a left foot part of the rider when the obstacle is located on a rear left side of the vehicle.

8. The approach notification device of the straddle type vehicle according to claim 1, further comprising an indicator as a second notification device, wherein the indicator is operated in accordance with detection of the approaching state.

9. The approach notification device of the straddle type vehicle according to claim 2, further comprising an indicator as a second notification device, wherein the indicator is operated in accordance with detection of the approaching state.

10. The approach notification device of the straddle type vehicle according to claim 3, further comprising an indicator as a second notification device, wherein the indicator is operated in accordance with detection of the approaching state.

11. The approach notification device of the straddle type vehicle according to claim 5, further comprising an indicator as a second notification device, wherein the indicator is operated in accordance with detection of the approaching state.

12. The approach notification device of the straddle type vehicle according to claim 6, further comprising an indicator as a second notification device, wherein the indicator is operated in accordance with detection of the approaching state.

13. The approach notification device of the straddle type vehicle according to claim 7, further comprising an indicator as a second notification device, wherein the indicator is operated in accordance with detection of the approaching state.

14. The approach notification device of the straddle type vehicle according to claim 1, wherein the plunger is arranged in parallel with and in the vicinity of the elastic member.

15. The approach notification device of the straddle type vehicle according to claim 1, wherein the winker manipulator is a winker switch supported on a handle switch that is fixed on a left side of a steering handle of the vehicle.

* * * * *